(12) United States Patent
Dujol et al.

(10) Patent No.: US 11,035,235 B2
(45) Date of Patent: Jun. 15, 2021

(54) TURBOMACHINE BLADE WITH OPTIMISED COOLING

(71) Applicant: SAFRAN AIRCRAFT ENGINES, Paris (FR)

(72) Inventors: Charlotte Marie Dujol, Le Mee sur Seine (FR); Sébastien Serge Francis Congratel, La Brosse Montceaux (FR); Patrice Eneau, Moissy-Cramayel (FR); Léandre Ostino, Melun (FR); Michel Slusarz, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 55 days.

(21) Appl. No.: 16/341,540

(22) PCT Filed: Oct. 18, 2017

(86) PCT No.: PCT/FR2017/052862
§ 371 (c)(1),
(2) Date: Apr. 12, 2019

(87) PCT Pub. No.: WO2018/073535
PCT Pub. Date: Apr. 26, 2018

(65) Prior Publication Data
US 2019/0376394 A1 Dec. 12, 2019

(30) Foreign Application Priority Data
Oct. 20, 2016 (FR) ...................... 16 01523

(51) Int. Cl.
*F01D 5/18* (2006.01)
(52) U.S. Cl.
CPC .......... *F01D 5/187* (2013.01); *F05D 2230/21* (2013.01); *F05D 2260/202* (2013.01); *F05D 2260/2212* (2013.01)

(58) Field of Classification Search
CPC . F01D 5/18; F01D 5/182; F01D 5/183; F01D 5/186; F01D 5/187; F05D 2260/202; F05D 2260/203
See application file for complete search history.

(56) References Cited

U.S. PATENT DOCUMENTS 5,356,265 A 10/1994 Kercher
9,995,148 B2 * 6/2018 Molter .................... F01D 5/188
(Continued)

FOREIGN PATENT DOCUMENTS

EP 3156596 A1 4/2017
WO 2014055259 A1 4/2014

OTHER PUBLICATIONS

Search Report issued in French Patent Application No. 16 01523 dated Jun. 8, 2017.
(Continued)

*Primary Examiner* — Woody A Lee, Jr.
*Assistant Examiner* — Brian O Peters
(74) *Attorney, Agent, or Firm* — Pearne & Gordon LLP

(57) ABSTRACT

A turbine blade of a turbine engine such as a turbojet engine, comprising: a root supporting a blade and extending in a wingspan direction, ending in a vertex, the blade comprising a leading edge and a trailing edge, with a pressure side wall and a suction side wall separated from one another and connecting the leading edge (17) to the trailing edge, the blade also comprising: cooling ducts in which air collected at the blade root circulates; first and second inner side recesses running along the pressure side wall in order to form a heat shield spaced apart from one another along the pressure side wall; and at least one duct extending from the pressure side wall to the suction side wall between the first and second side recesses.

10 Claims, 4 Drawing Sheets

(56) References Cited

U.S. PATENT DOCUMENTS

| | | | |
|---|---|---|---|
| 2014/0322008 A1* | 10/2014 | Molter | F01D 5/18 416/1 |
| 2017/0183969 A1 | 6/2017 | Dujol et al. | |
| 2017/0183970 A1 | 6/2017 | Dujol et al. | |
| 2017/0191368 A1 | 7/2017 | Dujol et al. | |
| 2018/0306035 A1 | 10/2018 | Eneau et al. | |
| 2018/0318913 A1 | 11/2018 | Vollebregt et al. | |

OTHER PUBLICATIONS

International Search Report issued in Application No. PCT/FR2017/052862 dated Feb. 7, 2018.
Written Opinion issued in Application No. PCT/FR2017/052862 dated Feb. 7, 2018.

* cited by examiner

TURBOMACHINE BLADE WITH OPTIMISED COOLING

This is the National Stage application of PCT international application PCT/FR2017/052862, filed on Oct. 18, 2017 entitled "TURBINE ENGINE BLADE WITH OPTIMISED COOLING", which claims the priority of French Patent Application No. 16 01523 filed Oct. 20, 2016, both of which are incorporated herein by reference in their entirety.

TECHNICAL FIELD

The invention relates to a blade of a turbomachine type aircraft engine blade, for example such as a twin spool turbojet engine or a twin-spool turboprop engine.

STATE OF PRIOR ART

As shown on FIG. 1, in such an engine identified as 1, external air is drawn in through an intake duct 2 to pass through a fan 3 comprising a series of rotating airfoils before being split into a central core flow and a bypass flow surrounding the core flow.

The core flow then passes through compression stages 4, 6, before reaching a combustion chamber 7, after which it expands passing through a set of turbines 8 before being evacuated in the aft direction generating thrust. The bypass flow is propelled directly in the aft direction by the fan to generate a complementary thrust. This engine 1 is delimited by an outer case 98 extending from its forward part to form the air intake duct, as far as an aft part forming a flow evacuation duct, the forward and aft sides being considered relative to the advance direction of the aircraft on which this engine is installed.

The expansion in the turbines 8 that drives the compressor and the fan, takes place at high temperature because it occurs immediately after combustion, such that these turbines are designed to function under severe temperature and pressure conditions.

Each turbine comprises a sequence of stages each comprising a series of blades oriented radially and uniformly spaced from each other around a central engine shaft. This central shaft carries rotating turbine elements and rotating elements of the compressor and the fan.

The turbine blades affected by the most severe conditions are the blades in the first expansion stages, namely the stages closed to the combustion zone, commonly called the high pressure stages.

In practice, higher performance needs require higher strength of the high pressure turbine blades, particularly concerning their strength at high temperature. This situation leads to a redesign of the cooling system for these blades to improve cooling so that they can resist these new operating conditions.

This cooling is achieved by circulating cool air drawn off from the turbojet upstream from combustion, inside these blades. This air is inlet at the root of the blade and is routed along an internal circuit in the blade to cool it, and it is evacuated outside the blade through drillings passing through the wall of this blade and distributed on this wall. These drillings are used to evacuate cooling air and to create an air film colder than air from combustion on the external surface of the blade, which also contributes to limiting the temperature of the blade.

The purpose of the invention is to disclose a blade structure that increases the cooling efficiency of this blade.

PRESENTATION OF THE INVENTION

To achieve this, the purpose of the invention is a turbine of a turbomachine such as a turboprop or a turbojet, the blade comprising a root, an airfoil supported on the root and extending along the length direction and terminating at a tip, the airfoil comprising a leading edge and a trailing edge located downstream from the leading edge, the airfoil comprising an intrados wall and an extrados wall at a spacing from each other and connecting the leading edge to the trailing edge, this airfoil also comprising:
- cooling ducts each extending laterally from the extrados wall as far as an upstream internal wall or as far as a downstream internal wall;
- an upstream lateral cavity and a downstream lateral cavity extending along the intrados wall to form a heat shield, at a spacing from each other along the intrados wall;
- the upstream lateral cavity extending laterally from the intrados wall as far as the upstream internal wall along a thickness of less than its length along the intrados wall;
- the downstream lateral cavity extending laterally from the intrados wall as far as the downstream internal wall along a thickness of less than its length along the intrados wall;
- a cooling conduit extending transversely from the intrados wall as far as the extrados wall between the upstream lateral cavity and the downstream lateral cavity.

With this arrangement, the lateral walls are distinct and are separated from each other along the skeleton of the blade. This separation into two parts provides better resistance to thermal expansions affecting the blade in service.

The invention also relates to a blade thus defined, in which the upstream lateral cavity and the downstream lateral cavity are arranged so as to form two branches of a pattern resembling the letter U extending along the length direction of the blades, each lateral cavity corresponding to one branch of this U, and in which these two lateral cavities are supplied jointly from the root through the same nozzle of this root.

The invention also relates to a blade thus defined, in which a conduit extending from the extrados wall to the upstream internal wall is connected to the conduit extending from the extrados wall to the intrados wall that is itself connected to a conduit extending from the extrados wall to the downstream internal wall, with a trombone circuit type layout to provide cooling air to the trailing edge The invention also relates to a blade thus defined, comprising a downstream manifold supplied through a conduit in the trombone circuit, this downstream manifold extending transversely from the intrados wall to the extrados wall, and in which the intrados wall comprises drillings opening into the downstream manifold of the trombone circuit to form an external cooling air film for the intrados wall.

The invention also relates to a blade thus formed, in which the downstream manifold is supplied from the conduit of the trombone circuit through calibrated passages.

The invention also relates to a blade thus defined, comprising an underbath cavity extending from a central region of the tip to the trailing edge, and at least one central conduit supplying this underbath cavity directly with air collected at the root.

The invention also relates to a blade thus defined in which the trailing edge comprises a series of through slits on the intrados side, supplied with cooling air, and in which these slits comprise:

one or several last slits close to the tip that are supplied through the underbath cavity;

slits that are supplied through a downstream conduit of the airfoil.

The invention also relates to a blade thus defined, comprising an upstream circuit to cool the leading edge of the airfoil.

The invention also relates to casting means for manufacturing a blade thus defined, comprising cavities and a set of cores designed to form internal conduits and manifolds, and internal cavities forming a shield.

The invention also relates to a turbine of a turbomachine comprising a blade thus defined.

The invention also relates to a turbomachine, comprising a turbine thus defined.

DETAILED PRESENTATION OF PARTICULAR EMBODIMENTS

Blade Structure

Figure 1:
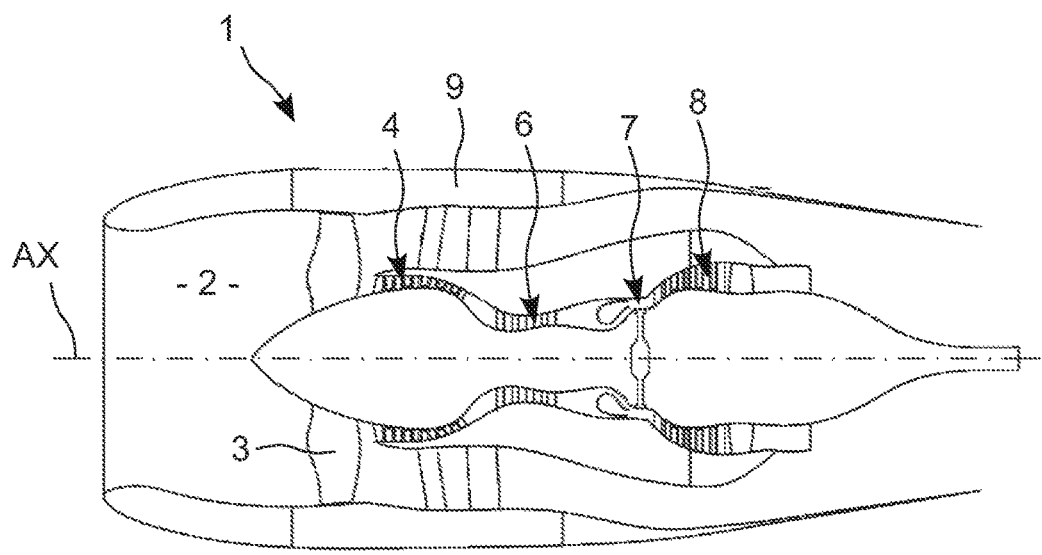
FIG. 1 is a longitudinal sectional overview of a twin spool turbojet.
Figure 2:
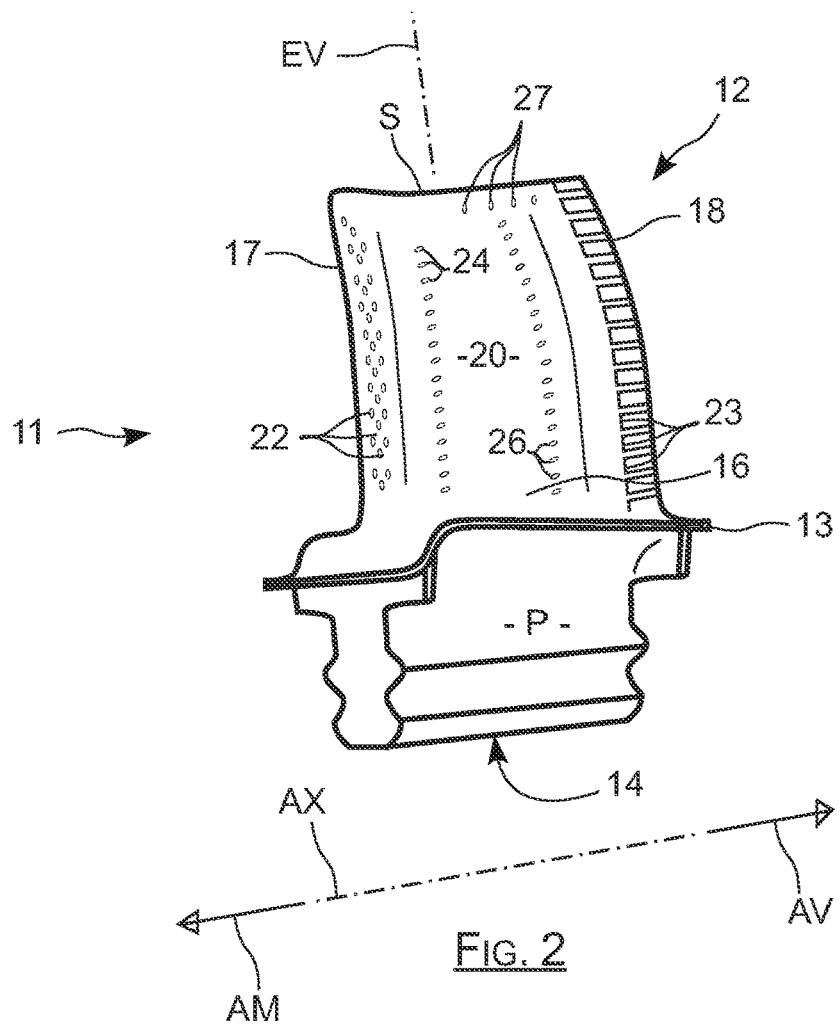
FIG. 2 is a perspective view of a high pressure turbine blade.

The blade according to the invention marked 11 on FIG. 2 comprises a root P by which it is fixed to a rotating body, not shown, called the turbine disk, and an airfoil 12 supported on this root P, with a platform 13 that connects the root P to the airfoil 12. This blade 11 comprises internal circuits in which cooling air inlet on the lower side 14 of the root P circulates.

The shape of the airfoil 12 is twisted about a so-called length axis EV perpendicular to an axis AX of rotation of the shaft supporting the blade, and its contour is approximately rectangular starting from a base 16 through which it is connected to the root P.

This airfoil 12 comprises a leading edge 17 approximately parallel to the length direction EV and located on the upstream or forward side AM of the blade, relative to the forward direction of the engine on which it is installed. It also comprises a trailing edge 18 oriented approximately parallel to the leading edge 17 and at a distance from it along the AX axis to be located on the downstream or aft side AV of the blade. It also comprises a tip S approximately parallel to the base 16 and at a distance from it along the length direction EV.

The two principal walls of this blade are its intrados wall 20 that can be seen in FIG. 2, and its extrados wall, that are at a distance from each other while remaining connected at the leading edge 17, at the trailing edge 18 and in the tip region S.

The leading edge 17 that is curved comprises cooling holes 22 passing through its wall, and the trailing edge 18 that is tapered comprises a series of cooling slits 23. These slits are short and extend parallel to the length direction EV, at a spacing from each other and along the prolongation of each other, and located at a short distance from the trailing edge itself. Each slit 23 passes through the intrados to blow air on the intrados wall towards the trailing edge that is provided with external ribs directing this air parallel to the X axis.

The intrados wall comprises a series of holes 24 distributed approximately parallel to the leading edge 17 and downstream from the leading edge, and another series of holes 26 distributed approximately parallel to the trailing edge 18, and upstream from the slits 23. These holes help to form an air film on the external face of the intrados to cool it.

At its tip S, this blade comprises a closing wall perpendicular to the length direction EV, that matches the intrados and extrados walls. This closing wall that is not visible on FIG. 2 is setback towards the AX axis relative to the free edges of the intrados and extrados walls, to jointly form a hollowed out portion called a bath with these edges, the bath being open in the direction opposite to the AX axis.

Another series of holes 27 passing through the intrados wall along the tip S, distributed parallel to the closing wall, help to form an air film on the external face of the intrados in the region of the tip S to cool it.

This blade is a single piece blade fabricated by casting a metallic material using a set of cores to delimit internal conduits, these cores being removed after casting and cooling for example using a chemical etching method.

FIGS. 4 to 9 show internal regions of the blade represented by shapes of cores used to fabricate this blade. Thus, the shapes of these figures are in relief, but they form representations of hollow shapes of the blade.

The blade 11 according to the invention comprises five internal cooling circuits. It comprises an upstream circuit 31; a central circuit 32; a median circuit 33 extending on each side of the central circuit; and a downstream circuit 34. Complementarily, a lateral circuit 36 comprising mainly an upstream lateral cavity 37 and a downstream lateral cavity 38 with small thickness that run along the intrados at intervals from each other along the intrados to form a heat shield.

Upstream Circuit

Figures 4, 5, 6:
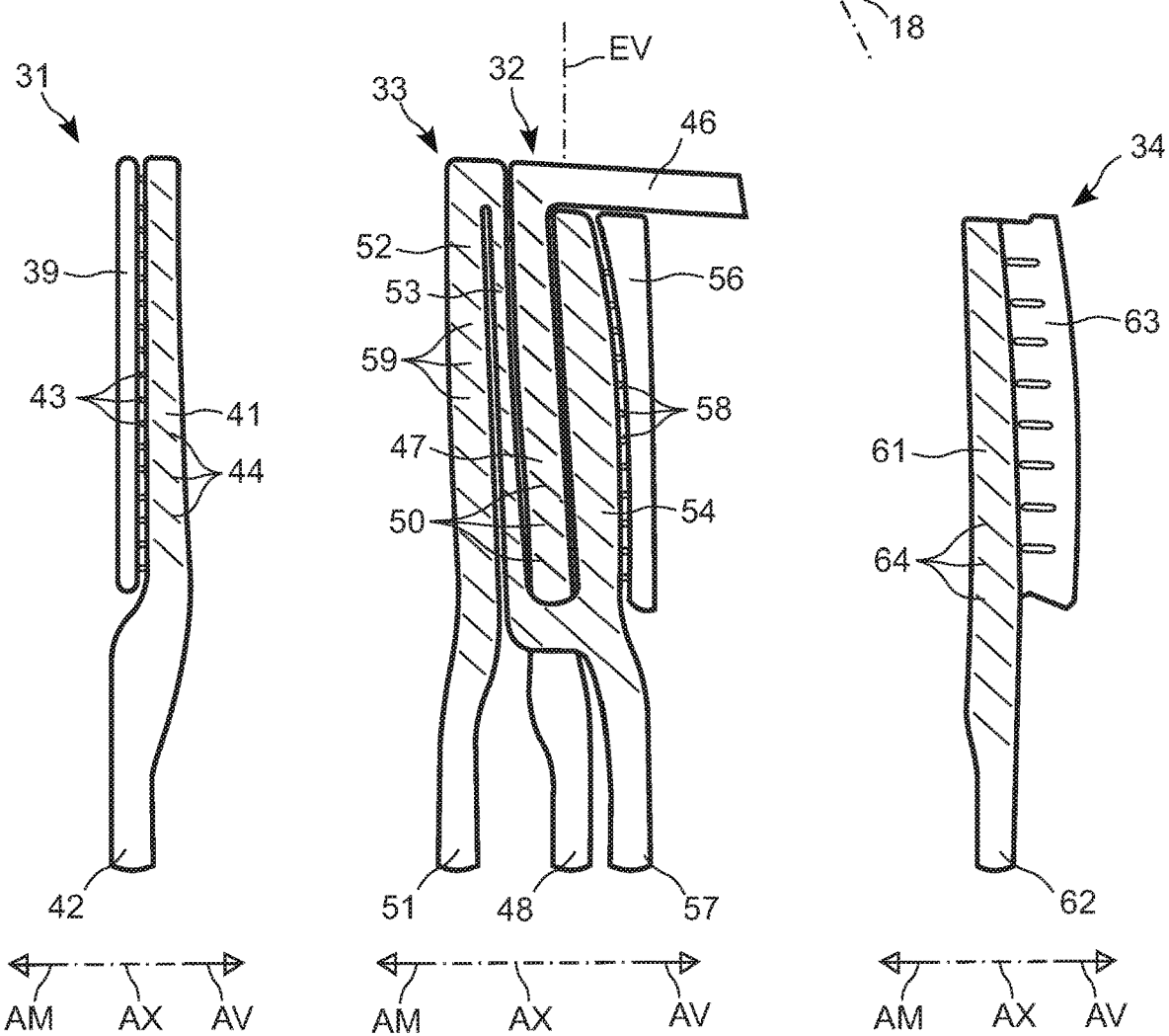
FIG. 4 is a lateral view showing an upstream cooling circuit for the leading edge of the blade according to the invention.
FIG. 5 is a lateral view showing a median circuit and a central cooling circuit of the blade according to the invention.
FIG. 6 is a lateral view showing a downstream cooling circuit for the trailing edge of the blade according to the invention.
Figure 7:
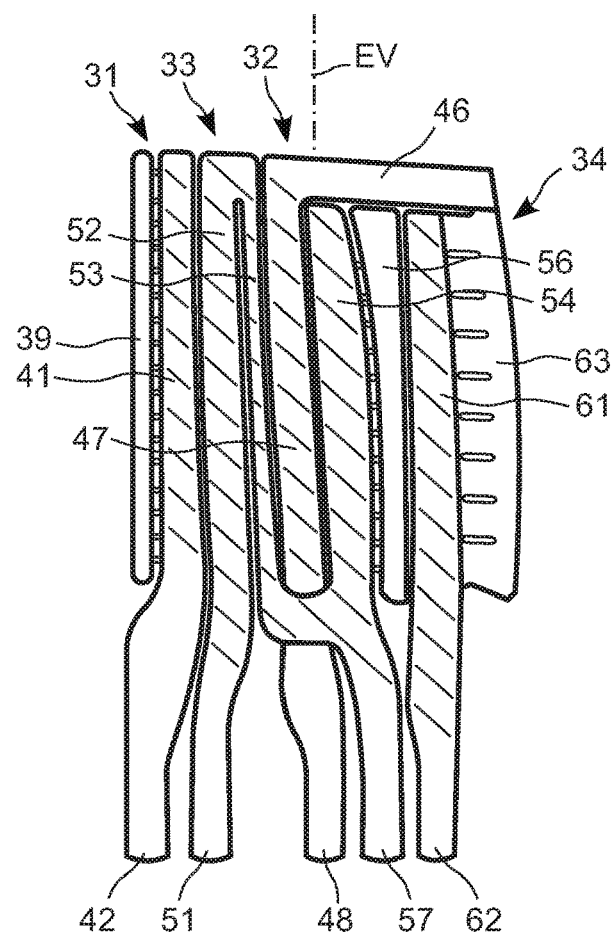
FIG. 7 is a lateral view of the intrados side showing the different cooling circuits of the blade according to the invention other than its lateral circuit.

As can be seen on FIG. 4, the upstream circuit 31 comprises an upstream manifold 39 and an upstream conduit 41 supplying this manifold 39 and extending parallel to the length direction EV. The upstream conduit 41 extends from the airfoil root to collect air from it at its nozzle 42, as far as a region of the tip S located under the bath, in other words under its closing wall. The upstream manifold 39 extends from the base 16 as far as the region under the bath, and it is supplied in a calibrated manner through calibrated passages 43 uniformly spaced along the direction of the length EV, each of which connects the upstream conduit 41 to the upstream manifold 39.

The diameter of each passage 43 is calibrated, in other words it is chosen to obtain a required air flow in the zone of the manifold 39 that it supplies. This calibrated supply to the upstream manifold 39 assures an impact type of cooling of the leading edge.

Complementarily, the upstream conduit 41 comprises turbulence promoters 44, in other words elements forming relief on its internal face, that generate turbulence in the air flow to increase heat exchange with the walls of the blade that delimit this conduit 41.

The upstream conduit 41 is thermally protected on the intrados side by the upstream lateral cavity 37 of the lateral circuit 36, such that it extends laterally from the extrados wall 21 as far as an upstream internal wall 30 that separates it from the upstream cavity 37.

Central Circuit

The central circuit 32 that appears on FIG. 5 comprises an upper cavity called the underbath cavity 46, and a central conduit 47 that supplies this underbath cavity 46 directly, to cool the tip. The central conduit extends from the root P of the blade where it comprises an air intake nozzle 48, and it leads into the bottom of the underbath cavity 46.

The underbath cavity 46 extends longitudinally from a central region of the tip S as far as the trailing edge 18, to supply cool air to one or to several of the slits 23 that are closest to the tip S.

This underbath cavity 46 is delimited laterally firstly through the extrados over its entire length, and secondly through the intrados in the aft part of the airfoil and through a downstream internal wall 49 that separates it from the downstream cavity 38 of the lateral circuit 36 in the central portion of the tip S corresponding to the forward part of this underbath cavity 46.

This underbath cavity 46 is delimited along the length axis EV by a bottom parallel to the closing wall and at a distance from it, and by the closing wall.

The central conduit 47 and the forward portion of the underbath cavity 46 are thermally protected by the downstream lateral cavity 38 of the lateral circuit 36. As can be seen on FIG. 3, the central conduit 47 extends laterally from the extrados wall as far as the downstream internal wall 49 that separates it from the downstream lateral cavity 38. Furthermore, the underbath cavity 46 and the central conduit 47 that supplies it can be provided with turbulence promoters 50.

Drillings 27 passing through the intrados wall towards this underbath cavity cool the external intrados face at the tip S.

Median Circuit

The median circuit 33 that can be seen on FIG. 5 comprises three conduits 52, 53 and 54 that communicate with each other according to a trombone layout, and a downstream manifold 56 supplied in a calibrated manner through the third conduit 54. The conduits 52, 53 and 54 and the manifold 56 extend parallel to the length direction EV, the first and the second conduits 52 and 53 being located upstream from the central conduit 47 of the circuit 32, while the third conduit 54 and the manifold 56 are located downstream from the conduit 47. In other words, the conduits of the median circuit 33 are located on opposite sides of the central conduit 47.

This median circuit 33 forming a trombone results in a uniform distribution of cooling in the blade while reducing the number of nozzles in the root. It can give efficient cooling of the trailing edge from cooling conduits that have a maximised cross-section.

The first conduit 52, that runs along the upstream conduit 41 of the upstream circuit 31, collects air at the root P through its nozzle 51 and it extends as far as an underbath region in which it is connected to the second conduit 53.

This first conduit 52 extends laterally from the extrados wall 21 as far as the upstream internal wall 40 that separates it from the upstream lateral cavity 37. As can be seen on FIG. 3, the first conduit 52 and the upstream conduit 41 are thermally protected on the intrados side by the upstream lateral cavity 37 of the lateral circuit 36.

The second conduit 53 of the median circuit 33 runs along the first conduit 52 while being wider than the conduits 52 and 54 to extend laterally from the intrados wall 20 as far as the extrados wall 21. This second conduit 53 is connected to the third conduit 54 in the base region 16 of the blade, this connection region prolonging into the root P in the form of a nozzle 57 that is actually closed. This closure is made after fabrication of the blade body by brazing a plate closing the nozzle 57, the shape of the nozzle 57 actually being used to hold the core element delimiting the median circuit 33 in position during the casting fabrication operation.

Figure 3:
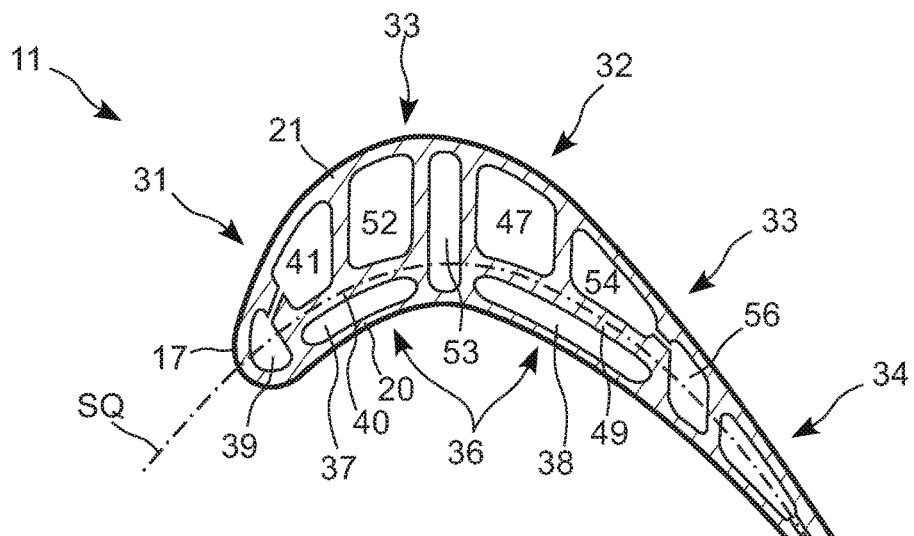
FIG. 3 is a sectional view of the blade according to the invention on a plane normal to the direction of its length.

As can be seen on FIG. 3, this second conduit 53 is majoritarily in contact with internal walls of the blade. The lateral width of its cross-section is large, but its thickness in the direction of the length, in other words along the skeleton SQ of the blade, is small. Thus, this second conduit 53 has contact zones with the intrados and the extrados that are not very extensive, which limits its temperature rise.

The third conduit 54 is at a distance from the second conduit 53 along the AX axis, and it extends from the base 16 as far as the region located under the underbath cavity 46, parallel to the downstream manifold 56 along which it runs while remaining upstream from the downstream manifold. This third conduit 54 extends laterally from the extrados wall 21 as far as the downstream internal wall 49 that separates it from the downstream lateral cavity 38.

The downstream manifold 56 runs along the third conduit 54 while being supplied by the third conduit in a calibrated manner through a series of calibrated passages 58, that are at a distance from each other along an axis parallel to the EV axis that lies parallel to the AX axis to uniformly supply air to the downstream manifold 56. This downstream manifold 56 is not protected by the downstream lateral cavity 38: it extends laterally from the extrados wall 21 as far as the intrados wall 20, and it supplies an external air film that covers and provides thermal protection for the trailing edge 18 on the intrados side, by means of drillings 26 passing through the intrados 20.

As can be seen on FIG. 3, the third conduit 54 and the central conduit 47 are thermally insulated from the intrados 20 by the downstream lateral circuit 38. The conduits 52, 53, 54 and the manifold 56 are advantageously provided with turbulence promoters 59.

Downstream Circuit

As can be seen on FIG. 6, the downstream circuit 34 comprises a downstream conduit 61 running along the downstream manifold 56. It extends parallel to the EV direction from a nozzle 62 located at the root P, as far as the underbath cavity 46, and a manifold 63 that supplies slits of the trailing edge that are not supplied by the underbath cavity 46. This downstream conduit 61 advantageously comprises turbulence promoters 64.

Lateral Circuit

Figure 8:
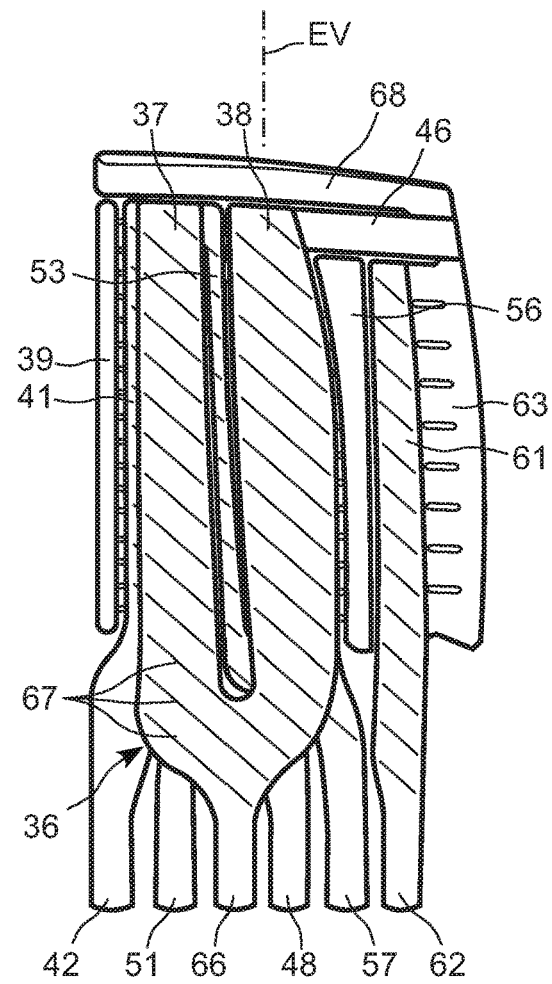
FIG. 8 is a lateral view of the intrados side showing the different cooling circuits of the blade according to the invention.
Figure 9:
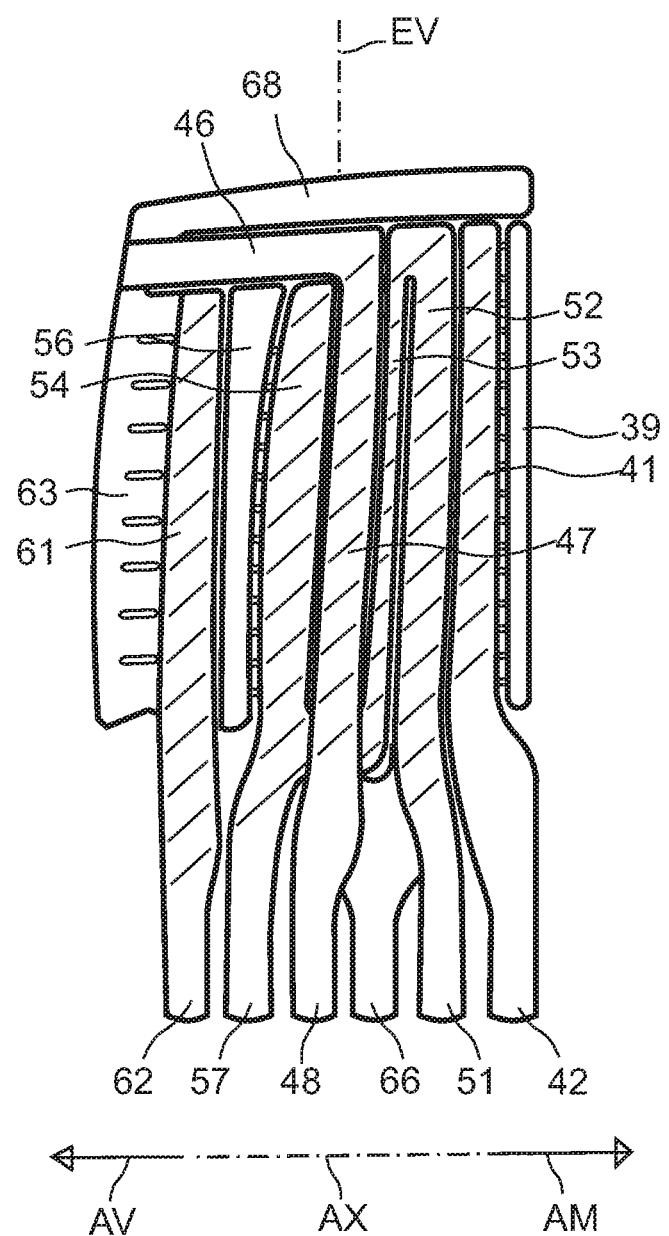
FIG. 9 is a lateral view of the extrados side showing the different cooling circuits of the blade according to the invention.

The lateral circuit 36 that is seen more clearly on FIG. 8 comprises an upstream lateral cavity 37 and a downstream lateral cavity 38 running along the extrados while being at a distance from each other along the extrados. The thickness of these cavities is small compared with the thickness of the blade and the thicknesses of its various conduits and manifolds; the thickness of each cavity measured along a direction normal to the SQ skeleton is less than its length along the intrados wall, measured along a direction approximately parallel to the direction of the AX axis.

These cavities 37 and 38 are supplied by the same nozzle 66 located in the root P while remaining distinct, which enables a uniform distribution of air while limiting air stagnation zones. These lateral cavities are advantageously provided with turbulence promoters 67. Complementarily, drillings such as drillings 24 pass through the intrados 20 to open up in these cavities 37, 38 providing evacuation of air while forming a film on the external face of the intrados 20.

The cavities 37 and 38 of the lateral circuit 36 are thus arranged in the form of a U along the length direction, each cavity corresponding to a branch of the U pattern, and they are supplied jointly from the same nozzle 66 to reduce the number of these nozzles and to improve the mechanical strength of the root. This arrangement can provide thermal protection of the median circuit 33 that efficiently supplies the manifold 56, and it is conducive to good mechanical failure of the airfoil due to the two distinct cavities 37, 38 that reinforce it.

The upstream lateral cavity 37 extends from the root P as far as the region of the tip S, while having a generally rectangular contour. It terminates under the bath, that is shown on FIGS. 8 and 9 in which it is marked 68, so as not to cover it. It extends over a sufficient length to mask or cover the upstream conduit 41 and the first conduit 52 of the median circuit 33 over most of their height. It extends laterally from the intrados wall as far as the upstream internal wall 40.

The downstream lateral cavity 38 also extends from the root P as far as the region of the tip S under the bath 68, while also having a generally rectangular contour. It also terminates under the bath so as not to cover it, and extends over a sufficient length so as to cover the central conduit 47 and the third conduit 54 of the median circuit. It extends laterally from the intrados wall 20 as far as the downstream internal wall 49.

The cavities 37 and 38 extend only between the cooling cavities and the intrados so as to release space for the conduits 47, 54 that can thus have a larger section to improve cooling of the trailing edge. This can provide a maximum amount of air in the trailing edge zone to limit thermomechanical stresses in this zone that is thermomechanically sensitive due to its narrowness.

ADVANTAGES

As can be seen on FIG. 3, the internal walls 40 and 49 are distinct and separate from each other along the length of the skeleton SQ of the blade through the second conduit 53 of the central circuit 32. This separation of the internal wall of the blade into two parts improves resistance to thermal stresses occurring in the blade, for which the internal temperature is different in different parts. In other words, the layout of the blade according to the invention can limit the length of the central skeleton by breaking it into two parts to make the internal structure more flexible.

In general, the upstream circuit 31 cools the leading edge 17 and an upstream portion of the extrados 21; the central circuit 32 cools the bath and a portion of the trailing edge 18; the median circuit 33 cools the extrados 21 and a downstream portion of the intrados 20; and the downstream circuit 34 cools the trailing edge 18. The invention thus makes it possible to dissociate the air supply from slits in the trailing edge and intrados drillings without penalising cooling of one zone relative to the other.

The upstream and downstream lateral cavities 37, 38 provide thermal insulation of the conduits in the circuit 33 to keep the central regions of the blade at a lower temperature, which contributes to improving its mechanical strength. In particular, the fact that the central conduit 47 is protected by the downstream lateral cavity 38 means that this cavity can supply cooler air to the underbath cavity.

What is claimed is:

1. A turbine blade of a turbomachine, the blade comprising: a root, an airfoil supported on the root and extending along a radial direction, terminating at a tip, the airfoil comprising a leading edge and a trailing edge spacing from each other along a longitudinal direction perpendicular to the radial direction and which extends from the leading edge to the trailing edge, the trailing edge being located downstream from the leading edge, the airfoil comprising an intrados wall and an extrados wall at a spacing from each other along a lateral direction which is perpendicular to the radial direction and to the longitudinal direction, the intrados wall and an extrados wall connecting the leading edge to the trailing edge, this airfoil also comprising:
    cooling ducts each extending laterally from the extrados wall as far as an upstream internal wall or as far as a downstream internal wall;
    an upstream lateral cavity and a downstream lateral cavity extending along the intrados wall to form a heat shield, at a spacing from each other along the intrados wall;
    the upstream lateral cavity extending laterally from the intrados wall as far as the upstream internal wall along the lateral direction with a thickness of less than a length of the upstream lateral cavity along the longitudinal direction the intrados wall the upstream lateral cavity protecting thermally two cooling ducts;
    the downstream lateral cavity extending laterally from the intrados wall as far as the downstream internal wall with a thickness of less than a length of the downstream lateral cavity along the intrados wall;
    a cooling conduit extending transversely from the intrados wall as far as the extrados wall between the upstream lateral cavity and the downstream lateral cavity;
    and wherein the thicknesses along the lateral direction of the upstream lateral cavity and the downstream lateral cavity are less than the thicknesses along the lateral direction of the other ducts of the blade.

2. The blade according to claim 1, wherein the upstream lateral cavity and the downstream lateral cavity are arranged so as to form two branches of a pattern resembling the letter U extending along the radial direction, each lateral cavity corresponding to one branch of this U, and in which these two lateral cavities are supplied jointly from the root through the same nozzle of this root.

3. The blade according to claim 1, wherein a conduit extending from the extrados wall to the upstream internal wall is connected to the conduit extending from the extrados wall to the intrados wall that is itself connected to a conduit extending from the extrados wall to the downstream internal wall, with a trombone circuit type layout to provide cooling air to the trailing edge.

4. The blade according to claim 3, comprising a downstream manifold supplied through a conduit in the trombone circuit, this downstream manifold extending transversely from the intrados wall to the extrados wall, and in which the intrados wall comprises drillings opening into the downstream manifold to form an external cooling air film for the intrados wall.

5. The blade according to claim 4, wherein the downstream manifold is supplied from the conduit of the trombone circuit through calibrated passages.

6. The blade according to claim 2, comprising an underbath cavity extending from a central region of the tip to the trailing edge, and at least one central conduit supplying this underbath cavity directly with air collected at the root.

7. The blade according to claim 6, wherein the trailing edge comprises a series of through slits on the intrados side, supplied with cooling air, in which these slits comprise:

one or several last slits that are supplied through the underbath cavity; and slits that are supplied through a downstream conduit of the airfoil.

8. The blade according to claim 1, comprising an upstream circuit to cool the leading edge of the airfoil.

9. A turbine of a turbomachine, comprising the blade according to claim 1.

10. A turbomachine comprising the turbine according to claim 9.

\* \* \* \* \*